US00RE48973E

(19) United States
(12) Reissued Patent
Meyer et al.

(10) Patent Number: US RE48,973 E
(45) Date of Reissued Patent: Mar. 15, 2022

(54) METHOD AND APPARATUS FOR WHEELBARROW FRONT END PROTECTION

(71) Applicant: Vection Ltd., Erie, CO (US)

(72) Inventors: Mathew D. Meyer, Erie, CO (US); Bryan Beard, Denver, CO (US)

(73) Assignee: VECTION LIMITED, Erie, CO (US)

(21) Appl. No.: 16/888,565

(22) Filed: May 29, 2020

Related U.S. Patent Documents

Reissue of:

(64) Patent No.: 10,124,820
Issued: Nov. 13, 2018
Appl. No.: 15/474,377
Filed: Mar. 30, 2017

U.S. Applications:

(60) Provisional application No. 62/315,457, filed on Mar. 30, 2016.

(51) Int. Cl.
*B62B 1/18* (2006.01)
*B62B 5/00* (2006.01)

(52) U.S. Cl.
CPC ..... *B62B 1/186* (2013.01); *B62B 5/0006* (2013.01); *B62B 2203/05* (2013.01); *B62B 2301/08* (2013.01)

(58) Field of Classification Search
CPC ..... B62B 1/18; B62B 1/186
USPC ..... 280/47.31, 47.17, 47.2, 47.131; 298/3
See application file for complete search history.

(56) References Cited

U.S. PATENT DOCUMENTS 273,225 A * 2/1883 Clark ..... B62B 1/18 280/47.12
385,381 A 7/1888 Spalding
1,243,432 A * 10/1917 Lemke ..... B62B 1/12 280/47.18
1,255,128 A 2/1918 Bayley
1,407,690 A 2/1922 Berry
(Continued)

FOREIGN PATENT DOCUMENTS

FR 886929 A 10/1943
GB 2457472 A 8/2009
(Continued)

OTHER PUBLICATIONS

Non-Final Office Action dated Feb. 15, 2018 issued in U.S. Appl. No. 15/474,377.
(Continued)

*Primary Examiner* — Russell D Stormer
(74) *Attorney, Agent, or Firm* — Voz Patents, LLC

(57) ABSTRACT

Embodiments of the invention are designed to be improvements over existing wheelbarrows. Certain embodiments comprise a frame, one or more weight-bearing wheels, and a pan. In certain embodiments, a wheelbarrow comprises a bight or a bumper having wheels. The wheels on the bight or bumper are located to the sides of a weight-bearing wheel. In certain embodiments, wheels located on each side of a bight or bumper portion allow a user to maneuver a wheelbarrow up or down a curb, or navigate stairs without causing damage to surfaces. Certain embodiments of the invention allow more efficient unloading of the contents of a wheelbarrow bed. Certain embodiments are designed to retrofit on existing wheelbarrows.

8 Claims, 8 Drawing Sheets

(56) References Cited

U.S. PATENT DOCUMENTS

| | | | | | |
|---|---|---|---|---|---|
| 1,436,965 | A | | 11/1922 | Landkamer | |
| 1,572,531 | A | | 2/1926 | Henkel | |
| 1,648,374 | A | | 11/1927 | Walker | |
| 1,804,403 | A | * | 5/1931 | Dowling | B62B 1/24 280/47.12 |
| 2,010,975 | A | | 8/1935 | Carter | |
| 2,462,424 | A | | 2/1949 | Popplewell | |
| 2,588,503 | A | | 3/1952 | Dwyer | |
| 2,598,261 | A | | 5/1952 | Hrabal | |
| 2,932,103 | A | | 4/1960 | Wright | |
| 3,092,418 | A | | 6/1963 | Themascus | |
| 3,248,128 | A | | 4/1966 | Grable | |
| 3,827,369 | A | | 8/1974 | Mueller | |
| 4,190,260 | A | | 2/1980 | Pearce | |
| 4,529,220 | A | | 7/1985 | Wright et al. | |
| 4,632,461 | A | | 12/1986 | Randolph | |
| 5,026,079 | A | | 6/1991 | Donze | |
| 5,067,737 | A | | 11/1991 | Broeske | |
| 5,087,061 | A | * | 2/1992 | Wallace | B62B 1/20 280/30 |
| 5,095,996 | A | | 3/1992 | Sprinkle | |
| 5,106,113 | A | | 4/1992 | Piacentini | |
| 5,149,116 | A | * | 9/1992 | Donze | B62B 1/20 280/47.26 |
| 5,242,177 | A | * | 9/1993 | Morris | B62B 1/20 280/47.31 |
| 5,531,463 | A | | 7/1996 | Givens | |
| 5,601,298 | A | | 2/1997 | Watanabe | |
| 5,690,191 | A | | 11/1997 | Burbank | |
| 5,758,867 | A | | 6/1998 | Arnesson | |
| 5,765,843 | A | | 6/1998 | Miller | |
| 5,768,867 | A | | 6/1998 | Bobst | |
| 5,806,878 | A | | 9/1998 | Mroczka | |
| 5,810,375 | A | * | 9/1998 | Hoffarth | B62B 5/06 16/446 |
| D404,534 | S | | 1/1999 | Dickson | |
| 5,884,924 | A | | 3/1999 | Fairchild | |
| 6,148,963 | A | * | 11/2000 | Canfield, Jr. | B60T 1/06 188/2 D |
| 6,220,622 | B1 | | 4/2001 | Garcia | |
| 6,446,989 | B1 | | 9/2002 | Intengan | |
| 6,886,838 | B1 | | 5/2005 | Zimmerman | |
| 6,908,088 | B2 | | 6/2005 | Feick | |
| 7,077,404 | B2 | | 7/2006 | Groskreutz | |
| D527,985 | S | | 9/2006 | Conaway | |
| 7,147,234 | B2 | | 12/2006 | Davis | |
| D535,451 | S | | 1/2007 | Lim | |
| 7,296,807 | B2 | | 11/2007 | Zimmerman | |
| 7,354,059 | B2 | | 4/2008 | Black | |
| 7,775,531 | B2 | | 8/2010 | Zimmerman | |
| 7,850,176 | B2 | | 12/2010 | Hill | |
| 7,866,686 | B2 | * | 1/2011 | Conaway | B62L 31/208 280/47.31 |
| 8,231,132 | B2 | | 7/2012 | DiLorenzo, Sr. | |
| D675,804 | S | | 2/2013 | Albert | |
| 8,474,856 | B2 | * | 7/2013 | Hawkes | B62B 1/12 280/47.18 |
| 8,535,184 | B2 | | 9/2013 | Pastore | |
| 9,090,273 | B2 | | 7/2015 | Albert | |
| 9,108,662 | B1 | | 8/2015 | Scholin | |
| 9,120,499 | B2 | | 9/2015 | Michel, Jr. | |
| 9,156,487 | B1 | | 10/2015 | Blume | |
| 2003/0015852 | A1 | * | 1/2003 | Swift | B62B 1/18 280/47.34 |
| 2004/0094921 | A1 | | 5/2004 | Groskreutz | |
| 2004/0188965 | A1 | | 9/2004 | Feick | |
| 2004/0227314 | A1 | | 11/2004 | Black, Jr. | |
| 2005/0134012 | A1 | | 6/2005 | Kan | |
| 2005/0146102 | A1 | | 7/2005 | Zimmerman | |
| 2005/0218614 | A1 | | 10/2005 | Black | |
| 2006/0250020 | A1 | | 11/2006 | Hill | |
| 2008/0067767 | A1 | | 3/2008 | Zimmerman | |
| 2008/0164668 | A1 | * | 7/2008 | Feick | B62B 1/20 280/47.31 |
| 2008/0277889 | A1 | * | 11/2008 | Strobel | B62B 1/18 280/47.31 |
| 2010/0201091 | A1 | * | 8/2010 | Easterling | B62B 1/20 280/47.31 |
| 2011/0275461 | A1 | | 11/2011 | Pastore | |
| 2013/0200582 | A1 | | 8/2013 | Feick | |
| 2015/0123361 | A1 | * | 5/2015 | Willett | B62B 1/002 280/47.18 |

FOREIGN PATENT DOCUMENTS

| | | | |
|---|---|---|---|
| WO | 2005014366 | A1 | 2/2005 |
| WO | 2005051744 | A2 | 6/2005 |
| WO | 2005051744 | A3 | 6/2005 |
| WO | 2005102811 | A1 | 11/2005 |
| WO | 2009019525 | A1 | 2/2009 |

OTHER PUBLICATIONS

Notice of Allowance dated Jul. 13, 2018 issued in U.S. Appl. No. 15/474,377.

Wheelbarrows www.globalsources.com/manufacturers/Wheelbarrow.html. [retrieved from the internet] [retrieved Mar. 17, 2017].

Wheelzbarrow Garden Wheelbarrow | Gardeners Edge. Published May 20, 2014. www.youtube.com/watch?v=76_O4DpraM.

* cited by examiner

METHOD AND APPARATUS FOR WHEELBARROW FRONT END PROTECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims benefit to U.S. Provisional Patent Application No. 62/315,457, entitled "Method and Apparatus for Wheelbarrow Front End Protection," filed Mar. 30, 2016, the contents of which are incorporated by reference in its entirety for all purposes.

FIELD OF THE INVENTION

Embodiments of the present disclosure generally relate to a wheelbarrow. Embodiments of the present invention are related to a wheelbarrow having a bight or a bumper with wheels. Embodiments of the present disclosure relate to a structure placed on a forward end of a wheelbarrow. Certain embodiments of the invention are located in front of a wheelbarrow wheel. Certain embodiments of the invention are provided as an attachment to existing wheelbarrows. Embodiments of the invention are designed to be improvements over existing wheelbarrows. Certain embodiments comprise a frame, a weight-bearing wheel, and a pan. In certain embodiments, a wheelbarrow comprises a bight or a bumper having wheels. The wheels on the bight or bumper are located to the sides of a weight-bearing wheel. In certain embodiments, wheels located on each side of a bight or bumper portion allow a user to maneuver a wheelbarrow up or down a curb, or navigate stairs without causing damage to surfaces. Certain embodiments of the invention allow more efficient unloading of the contents of a wheelbarrow bed. Certain embodiments are designed to retrofit on existing wheelbarrows

BACKGROUND OF THE INVENTION

Wheelbarrows are designed to assist a user in loading and unloading a load, meanwhile transferring such load across a distance. Wheelbarrows commonly comprise a pan to hold the load, a handle, a frame, and a wheel to allow movement of the wheelbarrow across a surface. Wheelbarrows are often operated on various surfaces or on and around various structures, such as driveways, curbs, sidewalks, and stairs. These surfaces or structures can be made of different materials, including dirt, grass, cement, concrete, tile, asphalt, wood, stone, and marble. During operation of a wheelbarrow, one may choose to unload the load from the pan. One way to unload the contents of a wheelbarrow is to tilt it forward or to the side, such that the load slides out of the pan.

Certain items that assist emptying a wheelbarrow include U.S. Pat. No. 2,462,424 to Popplewell ("the '424 Patent"), incorporated by reference in its entirety. The '424 Patent describes a prop placed on the front portion of a wheelbarrow frame. As a user tilts the wheelbarrow forward, such prop supports the wheelbarrow as to discharge the contents of the wheelbarrow. However, using the wheelbarrow as described in the '424 Patent may lead to potential damage to a surface or structure when tilted forward and pushed. For example, the wheelbarrow may cause damage to surfaces or structures if it is steered backwards down a set of stairs, or down a curb.

U.S. Pat. No. 4,190,260 to Pearce ("the '260 Patent"), incorporated by reference in its entirety, describes a rounded U-shaped portion found on a wheelbarrow frame in front of a wheel. When the wheelbarrow is tilted forward, the rounded portion touches the ground, stabilizing the wheelbarrow when its contents are unloaded. However, using the wheelbarrow as described in the '260 Patent may lead to potential damage to a surface or structure when tilted forward and pushed. The wheelbarrow may cause damage to surfaces or structures while in use (for example, using or steering the wheelbarrow in a forward direction), steering backwards down a set of stairs, or down a curb. Wheelbarrows such as that described by '260 Patent are hazardous because the front portion may catch onto a surface during use. A wheelbarrow inadvertently catching a surface poses problems for the user. These problems include, for example, premature dumping of the contents of the wheelbarrow, and sudden stopping of the wheelbarrow, which could cause a user to lost balance, trip, fall, or otherwise injure themselves. Due to fear of such wheelbarrows catching on a surface, a user may steer the wheelbarrow in a manner that compromises stability, and potentially leaving them prone to lose balance, tripping, falling, or others rise injuring themselves on the wheelbarrow.

U.S. Pat. No. 3,248,128 to Grable ("the '128 Patent"), incorporated by reference in its entirety describes a pivoting load-bearing plate in front of a wheelbarrow wheel. When the wheelbarrow is tilted forward, the wheelbarrow pan pivots on the load-bearing plate when emptying the wheelbarrow. However, the wheelbarrow as described in the '128 Patent may cause damage to surfaces or structures if it is steered backwards down a set of stairs, or down a curb.

U.S. Pat. No. 5,026,079 to Donze ("the '079 Patent"), incorporated by reference in its entirety, describes a wheelbarrow that has a component that allows pivoting the wheelbarrow when it is tilted forward or to the side. However, the wheelbarrow as described in the '079 Patent may cause damage to surfaces or structures if it is steered backwards down a set of stairs, or down a curb.

U.S. Pat. No. 6,908,088 to Feick ("the '088 Patent"), incorporated by reference in its entirety describes a convex bumper attachment. The bumper attachment attaches to a wheelbarrow frame, in front of a wheel. Tilting a wheelbarrow forward allows the weight of the wheelbarrow to rest on the bumper attachment for easier emptying of the load. However, the wheelbarrow as described in the '088 Patent may cause damage to surfaces or structures if it is steered backwards down a set of stairs, or down a curb.

U.S. Pat. No. 5,601,298 to Watanabe ("the '298 Patent"), incorporated by reference in its entirety, discloses a guard placed in front of a wheelbarrow wheel. Some embodiments of the front guard are curved rigid structures that allow a user to tilt a wheelbarrow forward to empty the wheelbarrow. However, the wheelbarrow as described in the '298 Patent may cause damage to surfaces or structures if it is steered backwards down a set of stairs, or down a curb.

The features disclosed in, for example, the '424 Patent, the '260 Patent, the '128 Patent, the '079 Patent, the '088 Patent, and the '298 Patent provide a way to tilt a wheelbarrow forward and empty the load. However, while tilting the wheelbarrow forward and moving the wheelbarrow in a forward or backward motion, these features can hit, grate, grind, scrape, or otherwise cause damage to structures.

The disclosures in the '260 Patent and the '088 Patent attempt to mitigate this problem by using a material, such as rubber or plastic, for a portion of these features. However, one may guide a wheelbarrow by moving it backwards down a curb or down a set of stairs. When guiding a wheelbarrow backwards, certain features may still contact and grind against the curb or stairs, damaging the curb or stairs.

U.S. Pat. No. 2,588,503 to Dwyer ("the '503 Patent"), incorporated by reference in its entirety describes a cylindrical roll on the front portion of a wheelbarrow frame. Tilting the wheelbarrow forward causes the roll to rest on the ground, assisting one to discharge the contents of the wheelbarrow. While the cylindrical roll may lead to less damage while guiding a wheelbarrow backwards, the cylindrical roll does not effectively grip a surface when the wheelbarrow is tilted forwards. The wheelbarrow as described by the '503 Patent may also be difficult to balance when emptying the wheelbarrow on end, as it lacks a rigid contact with the ground.

U.S. Pat. No. 1,804,403 to Dowling ("the '403 Patent"), incorporated by reference in its entirety, describes a set of wheels located towards a front of a wheelbarrow. While the wheels may lead to less damage while guiding a wheelbarrow backwards, the wheel does not effectively grip a surface when the wheelbarrow is tilted forwards. The wheelbarrow as described by the '403 Patent may also be difficult to balance when emptying the wheelbarrow on end, as it lacks a rigid contact with the ground.

U.S. Pat. No. 5,531,463 to Givens ("the '463 Patent"), incorporated by reference in its entirety, describes a set of wheels oriented laterally on a wheelbarrow frame. The wheels allow a user to empty a wheelbarrow out the wheelbarrow sides by laterally tilting the wheelbarrow. The '463 Patent is limited to tilting wheelbarrows to the side.

Thus, there is a need for a wheelbarrow that facilitates emptying the contents in a forward direction, while minimizing damage to surrounding structures while, for example, moving the wheelbarrow in a forward direction, emptying the contents of a wheelbarrow or carrying the wheelbarrow backwards down a curb, a ledge, or a set of stairs. There is a need for an aftermarket system or apparatus attaching to wheelbarrows.

SUMMARY OF THE INVENTION

Embodiments of the present invention are designed to be improvements over existing wheelbarrows. Certain embodiments comprise a frame, a weight-bearing wheel, and a pan. Certain embodiments include a wheelbarrow having one or more weight-bearing wheels. In certain embodiments, a wheelbarrow comprises a bumper or a bight having wheels. The wheels on the bumper or bight are located to the sides of, or in between, a weight-bearing wheel or wheels. Certain embodiments of the invention are designed to reduce the occurrence of property damage. In certain embodiments, wheels located on each side of a bumper portion allow a user to maneuver a wheelbarrow up or down a curb, or navigate stairs without causing damage to surfaces. In certain embodiments, as a user steers a wheelbarrow forwards, while turning, backwards down a curb or down a set of stairs, or up a curb or up a set of stairs, wheels located on each side of a bumper protect a curb or stairs from contacting a front plate portion or cross member. In certain embodiments, wheels located on each side of a bumper portion protects a wheelbarrow from catching on certain structures (such as that found on uneven terrain, trailer gates, steps etc.) as to prevent unintentional tipping of a wheelbarrow that could compromise a load.

In certain embodiments, the wheelbarrow and wheelbarrow bumper improves efficiency in workflow. In certain embodiments of the invention, wheels on a bumper allow more efficient unloading of the load from a wheelbarrow pan. The wheels located on either side of a bumper act as an initial contact region as a user tilts the wheelbarrow forward, and a front plate portion or cross member acts as a second contact region that engages with the ground. In certain embodiments, the wheels act as a bumper. Certain embodiments have gripping features located on a front plate or cross member to allow better gripping of a surface when the wheelbarrow is tilted forward, preventing unwanted sliding while tilting a wheelbarrow. In certain embodiments, a user can tilt the wheelbarrow at a greater angle, allowing easier emptying of the wheelbarrow contents. Certain embodiments of the present invention are designed to reduce the occurrence of personal injury. Wheels located on each side of a bumper provide added stability when tilting the wheelbarrow to discharge a load. In certain embodiments, the wheels located on a bumper portion provides added stability when steering the wheelbarrow, allowing for tighter turning of the wheelbarrow.

Certain embodiments have openings that allow affixing on existing wheelbarrows using fasteners. Certain embodiments comprise attaching members, a cross member, and two wheels that are assembled by an end user, allowing packaging the device in a compact form. Certain embodiments include a bumper having a bent member, where such bumper includes two wheels that act as an initial contact region as a user tilts the wheelbarrow forward.

DETAILED DESCRIPTION OF CERTAIN EMBODIMENTS

Figure 1:
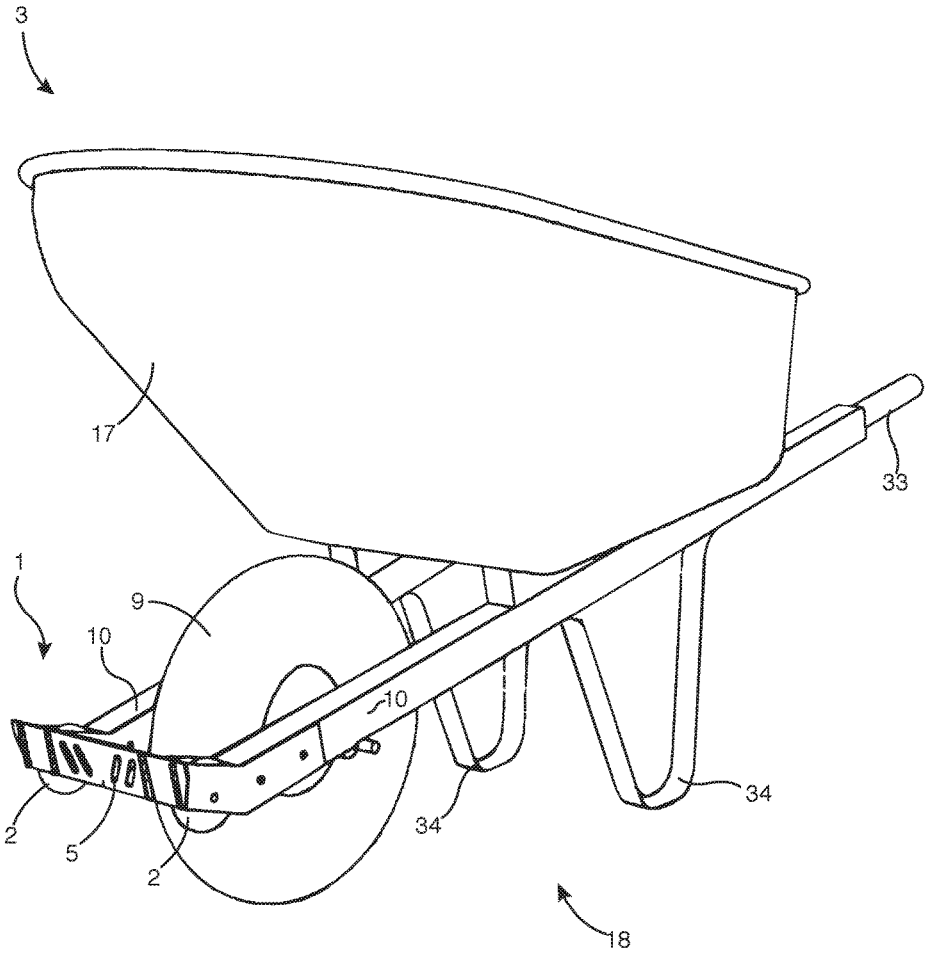
FIG. 1. Perspective view of a wheelbarrow with an embodiment of a bumper.

Embodiments of the invention include a wheelbarrow. In certain embodiments, a wheelbarrow 3 has a pan 17, a frame 18, a main wheel 9, and a bight or bumper. As shown, for example, in FIG. 1 and FIG. 8A, a frame 18 has a main wheel 9 having an axle disposed between two bars 10. A wheelbarrow frame 18 has handles 33 to help to steer the wheelbarrow during use. Legs 34 attached to a lower portion of a wheelbarrow frame 18 keep the wheelbarrow upright. Still referring to FIG. 1 and FIG. 8A, a pan 17 is attached above such frame.

Figure 5:
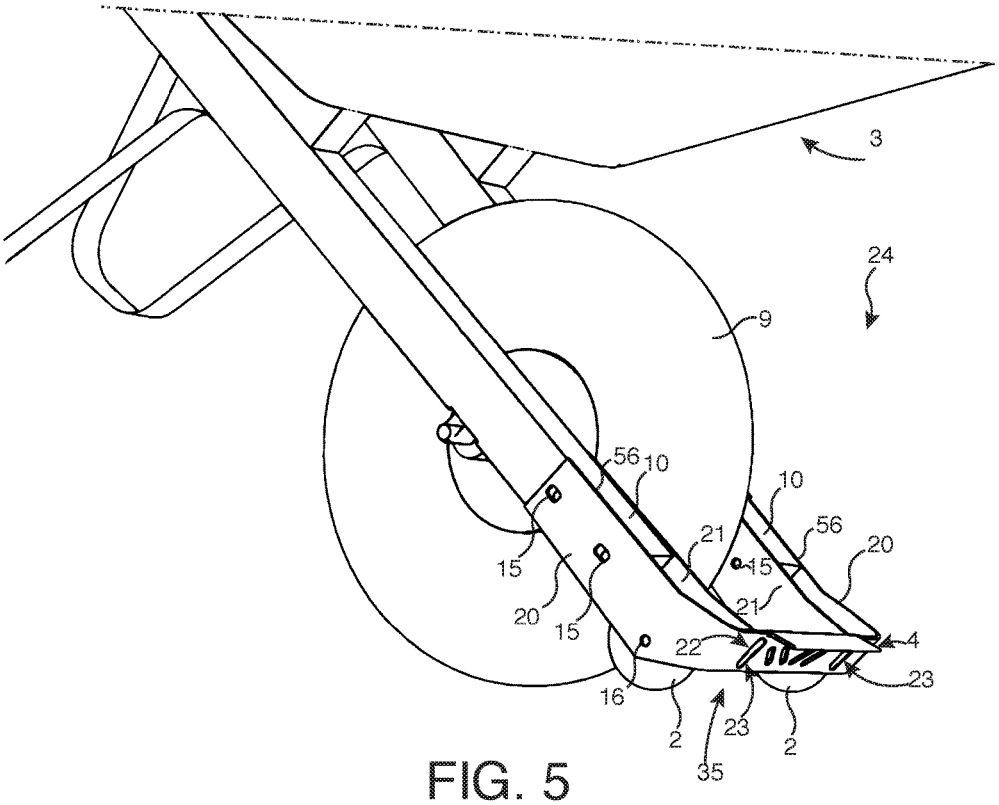
FIG. 5. Perspective view of a wheelbarrow with an embodiment of a bumper.
Figure 7:
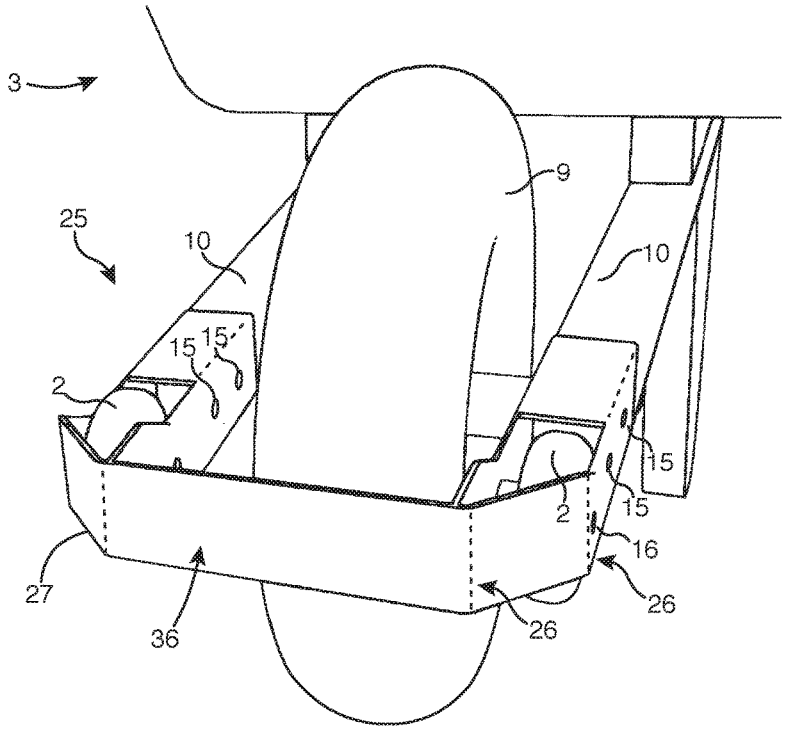
FIG. 7. Close up perspective view of a wheelbarrow with an embodiment of a bumper.
Figure 8A:
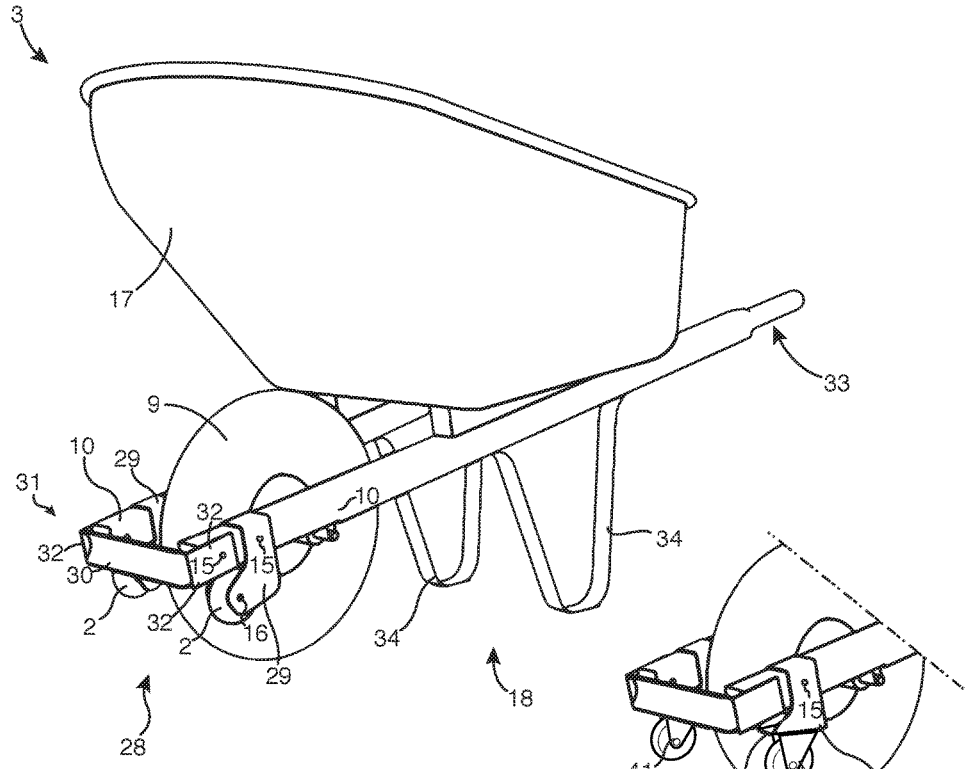
FIG. 8A. Perspective view of a wheelbarrow with an embodiment of a bumper.

In certain embodiments of the invention, a bumper is attached to the front portion of a wheelbarrow. An embodiment of a bumper 1 as shown in FIG. 1, an embodiment of a bumper 24 as shown in FIG. 5, an embodiment of a bumper 25 as shown in FIG. 7, and an embodiment of a bumper 28 as shown in FIG. 8A is attached to the front portion of a wheelbarrow 3 in front of a main wheel 9. It will be appreciated that a bumper as disclosed herein can be attached to a wheelbarrow having more than one main wheel. Still referring to FIG. 1, and also shown, for example, in FIG. 5, FIG. 7, and FIG. 8A, a bumper has at least one wheel, preferably two wheels 2. In certain embodiments, a wheel 2 has a size smaller than that of the main wheel 9. It is preferable to have a wheel 2 having a diameter of between 5.08 cm (2 inches) and 17.78 cm (7 inches) for many applications. In certain embodiments, it is preferable to have a wheel 2 having a diameter of between 5.08 cm (2 inches) and 12.7 cm (5 inches). It can be appreciated that a wheel 2 diameter is not limited to such sizes, as diameters less than 5.08 cm (2 inches) or more than 17.78 cm (7 inches) may be used for certain wheelbarrow sizes. In certain embodiments, a wheel 2 has a size similar to that of the main wheel 9. It will be appreciated that the material of a wheel 2 includes, but is not limited to, for example, rubber, vulcanized rubber, rubber materials, metals such as steel and aluminum, plastics, polymers, polyurethane, nylon, carbon composite, glass fiber composite, and wood.

Figure 2A:
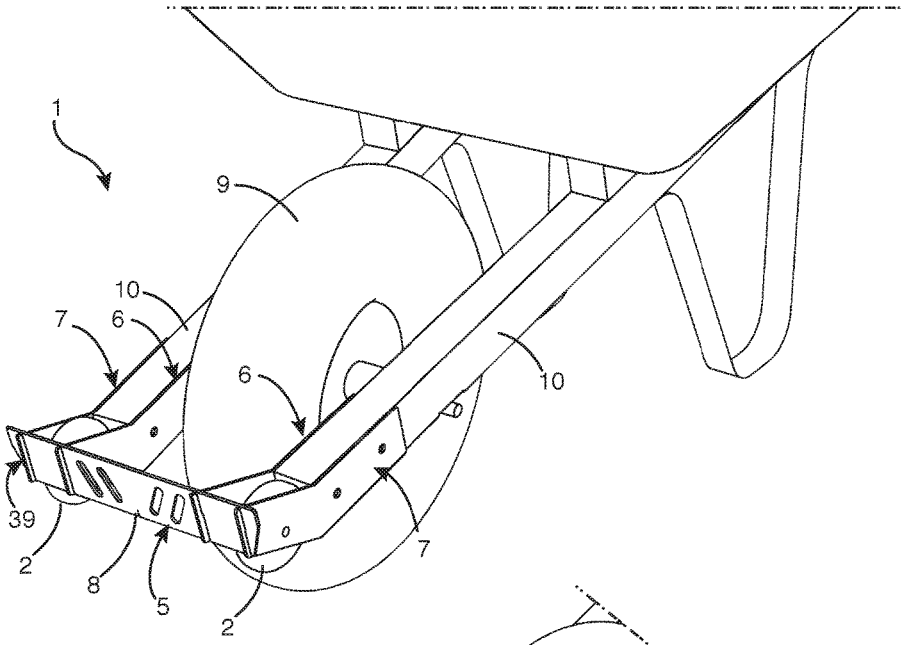
FIG. 2A. Close-up perspective view of a wheelbarrow with an embodiment of a bumper.

Certain embodiments of the invention have an outer attachment member 7 (also referred to as an outer plate), and an inner attachment member 6 (also referred to as an inner plate). Referring to FIG. 2A, an outer attachment member 7 and an inner attachment member 6 attach to a cross member 8 (also referred to as a front plate). It will be appreciated that certain embodiments of a bumper will include a cross member attaching to inner attachment members, and certain embodiments will include a cross member attaching to outer attachment members.

Figure 2B:
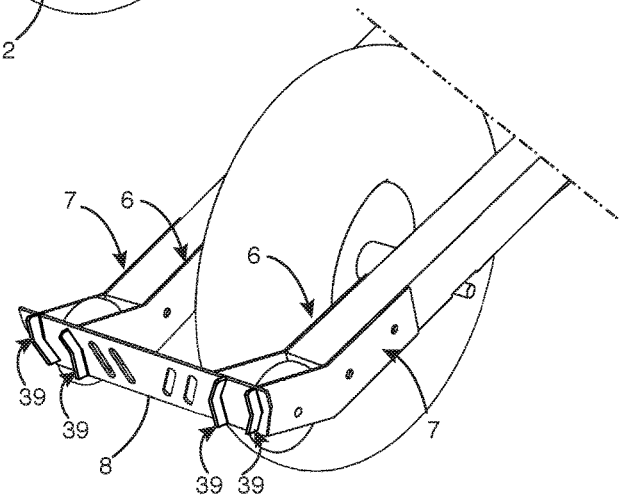
FIG. 2B. Close-up perspective view of a wheelbarrow with an embodiment of a bumper.
Figure 3:
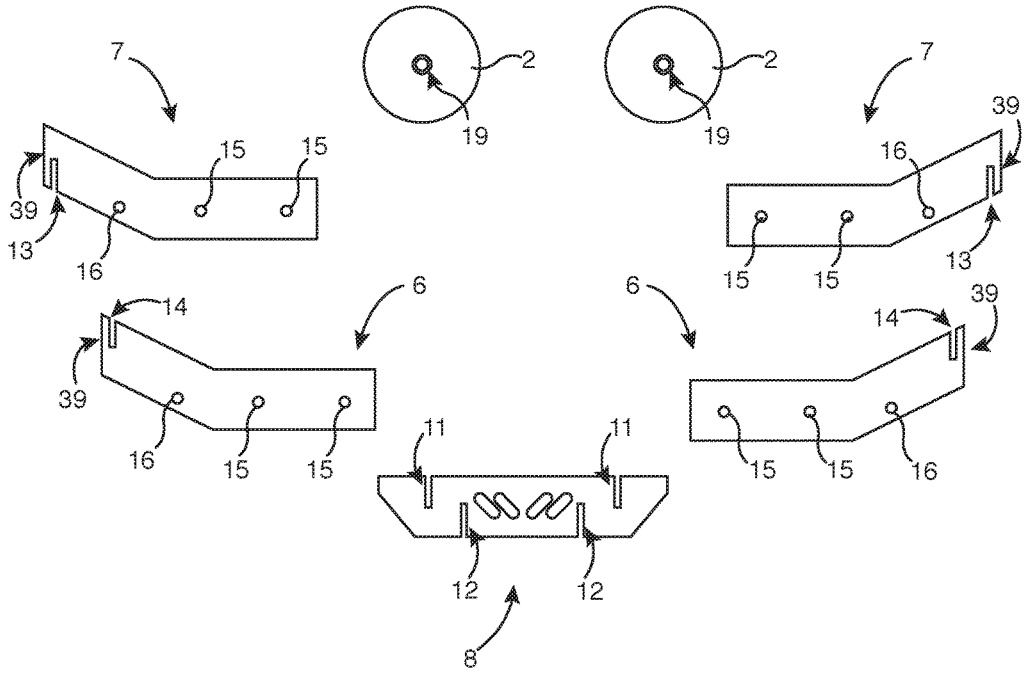
FIG. 3. Top view of an embodiment of a bumper, comprising an inner attachment member, an outer attachment member, a cross member, and a wheel.

Referring to FIG. 3, outer attachment member 7 has a slot 13 having a fit with slot 11 of the cross member 8. Referring still to FIG. 3, an inner attachment member 6 has a slot 14 having a fit with slot 12 of the cross member 8. In certain embodiments, an outer attachment member 7 and an inner attachment member 6 are disposed in a parallel orientation. Referring to FIG. 3, an outer attachment member 7 and an inner attachment member 6 have an extension 39 adjacent to slot 13, 14. It will be appreciated that extension 39 may extend away from such slot in any distance and be available in varying shapes, thicknesses, and sizes. An extension 39 may be bent as seen, for example, in FIG. 2B further securing cross member 8 to outer attachment member 7 or inner attachment member 6. In yet another example, an extension 39 may be bent in a direction generally parallel to the direction of a cross member 8. It will be appreciated that an extension 39, 52, and tabs 23, 53 as seen for example in FIG. 2B, FIG. 3, FIG. 4B, FIG. 5, FIG. 6, and FIG. 12B may be bent, twisted, curved, or otherwise modified as to secure one member, plate, or piece to another member, plate or piece. Such modification can further add additional gripping surface on cross member 8 when the wheelbarrow is tilted forward. A wheel 2 is attached between the outer attachment member 7 and an inner attachment member 6 with an axle passing through the central bore 19 of the wheel, and openings 16 of the inner attachment member and outer attachment member, as shown for example in FIG. 2A and FIG. 3. It will be appreciated that in certain embodiments, a wheel includes a hub having bearings. Referring to, for example FIG. 2A, the bumper 1 is mounted to a front portion of the bar 10 with a fastener passing through openings 15 located on an outer attachment member 7 and inner attachment member 6. It will be appreciated that a [faster] *fastener* includes any type of object used to fasten, including, but not limited to, screws, bolts, and rivets.

In certain embodiments, the wheels 2 on the bumper 1 are located to the sides of a main wheel 9. Certain embodiments of the invention are designed to reduce the occurrence of damage to surfaces and property damage in general. In certain embodiments, wheels 2 located on each side of a bumper 1 allow a user to maneuver a wheelbarrow up or down a curb, or navigate stairs without causing damage to surfaces. In certain embodiments, as a user steers a wheelbarrow forwards, while turning, backwards down a curb or down a set of stairs, or up a curb or up a set of stairs, wheels 2 prevent a front region of a bumper 1, such as a cross member 8, from contacting the curb or stairs. In certain embodiments, a wheel 2 protects a wheelbarrow from catching on certain structures (such as that found on uneven terrain, trailer gates, steps etc.) as to prevent unintentional tipping of a wheelbarrow that could compromise a load.

In certain embodiments, when a user tilts a wheelbarrow 3 forward, the cross member 8 acts as a surface for which the wheelbarrow engages with the ground. As shown, for example, in FIG. 1 and FIG. 2A, a cross member has gripping features 5 that increase traction of the cross member when engaging with the ground. It will be appreciated that embodiments of a cross member, shown for example in FIG. 3, FIG. 4, FIG. 5, FIG. 6, FIG. 7 and FIG. 8A may also include gripping features. In general, gripping features allow a cross member to grip a surface, mitigating sliding, when a wheelbarrow is tilted forward. In certain embodiments, gripping feature 5 found on a cross member includes, but is not limited to openings of certain patterns or shapes, added textures, added material (for example, rubber), and bending of the materials that comprise the bumper, such as those of a cross member or an attachment member. In certain embodiments, a gripping feature further includes a tab 4, as shown for example in FIG. 4A, FIG. 5, and FIG. 10A.

In certain embodiments, a portion of a bumper is created from a sheet of metal, such as by metal stamping, water jet cutting, laser cutting. As shown, for example, in FIG. 3, pieces such as a cross member 8, an inner attachment member 6, and an outer attachment member 7 can be created from a sheet of metal. Such pieces can be packaged, delivered, and/or sold as a flat-pack. Flat-pack packaging has the potential to reduce space and/or cost during shipping. Such flat pack packaging can be assembled by an end user, and assembled on existing wheelbarrows.

Figure 4A:
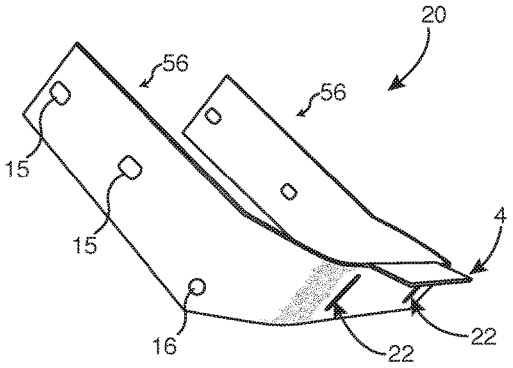
FIG. 4A. Perspective view of a shaped member in an embodiment of a bumper.
Figure 4B:
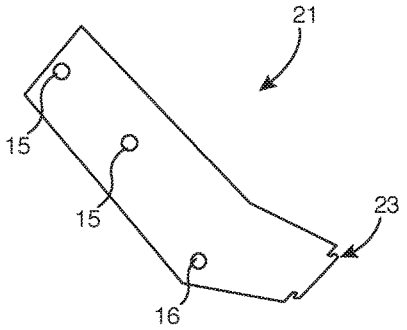
FIG. 4B. Perspective view of an inner attachment member in an embodiment of a bumper.

Referring to FIG. 4A and FIG. 4B, certain embodiments of a bumper 24 have shaped member 20 (also referred to as a shaped plate) having a u-shape, and an inner attachment member 21. A bumper 24 is assembled by engaging a tab 23 of an inner attachment member 21 through a slot 22 of a shaped member 20, as shown in FIG. 5. A wheel 2 is attached to or mounted between a shaped member 20 and an inner attachment member 21 with an axle secured to openings 16, as shown in FIG. 4A, FIG. 4B, and FIG. 5. A shaped member 20 further has a cross member 35 (also known as a front region) that engages with the ground when a user tilts the wheelbarrow forward. Referring to FIG. 5, attachment ends 56 flanking a cross member 35 allow the shaped member 20 to attach to the wheelbarrow bars 10. Certain embodiments further have a tab or flap 4, as shown, for example, in FIG. 5. It will be appreciated that a flap 4 may be included for certain embodiments of the bumper, including, but not limited to the illustration in FIG. 10A. While tilting a wheelbarrow forward, the tab or flap 4 engages with the ground as to facilitate emptying the contents of the wheelbarrow. In certain embodiments, a flap is a piece of material protruding from a bumper. Referring to FIG. 4A, FIG. 4B, and FIG. 5, a bumper 24 is mounted to a front portion of a bar 10 with a fastener passing through openings 15 located on a shaped member 20 and inner attachment member 21.

Figure 6:
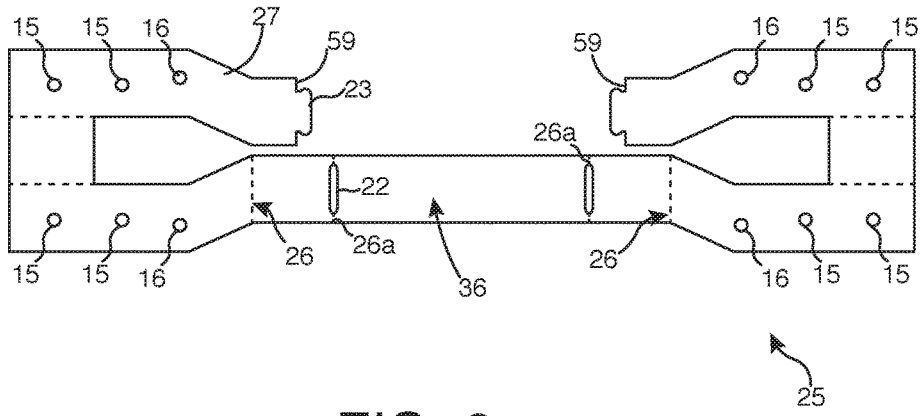
FIG. 6. Top view of an embodiment of a bumper prior to assembly.

Referring to FIG. 6 and FIG. 7, certain embodiments of a bumper 25 is a single body plate 27 folded to attach to a front portion of a wheelbarrow. In certain embodiments, a single body plate 27 is a single body or a continuous piece of material. In certain embodiments, a single body plate 27 can be created from a sheet of metal, for example, by stamping. In certain embodiments, folds are created along fold lines 26 (dashed lines, as shown for example in FIG. 6). Such single body plate 27 is further bent to create a three dimensional bumper 25, as shown in FIG. 7. In certain embodiments, a single body plate 27 includes a tab 23 on an edge 59 to join with a slot 22 on a fold 26a adjacent to a cross member 36 as shown in FIG. 6. It will be appreciated that an edge 59 and fold 26a can be secured with, for example, a slot connection, welding, fusing, or other assembly techniques. In certain embodiments, manufacturing of a bumper reduces excess waste. For example, the excess material left from cutting a single body plate 27 from a sheet of metal can be recycled. In certain embodiments, fold lines 26 as shown in FIG. 6 may be cut lines. Individual pieces cut from, for example, single body 27 are assembled to form a bumper 25, as shown in FIG. 7.

In general, assembly can involve, for example, welding, fusing, soldering, bonding, gluing, a slideable slot connection, a tab and slot connection, or otherwise securing the pieces to form such bumper structure. In certain embodiments, the structure of the bumpers are made of materials natural or manmade, including but not limited to metal and metallic materials such as aluminum, copper, brass, iron, stainless steel, and metal alloys, reinforced polymers including but not limited to carbon fiber, materials polymeric such as plastics including but not limited to PET, HDPE, PVC, rubbers organic and synthetic, and wood.

Referring to FIG. 7, a bumper 25 is attached to the bar 10 of a frame of a wheelbarrow by securing a fastener through openings 15 located on the single body plate 27. A wheel 2 is attached to a single body plate 27 with an axle secured to openings 16. Still referring to FIG. 6 and FIG. 7, a cross member 36 (also referred to as a front portion) of a single body plate 27 engages with the ground when a user tilts a wheelbarrow forward. In certain embodiments, a single body plate 27 engages the ground after the wheels 2 initially contact the ground, providing additional leverage as a user discharges the wheelbarrow content.

Referring to FIG. 8A, certain embodiments of a bumper 28 has a front portion 31 and a back portion 29. A front portion 31 is attached between two bars 10 at a front end of a wheelbarrow 3, as shown in FIG. 8A. An exemplary front portion 31 features a concave cross member 30 attached to attachment member 32 (also referred to as a side plate), as shown in FIG. 8A. Such concave cross member 30 engages with the ground when a user tilts a wheelbarrow forward. Certain embodiments of an attachment member 32 have an opening 15 that allows fastening a front portion 31 to bars 10 of a wheelbarrow. In certain embodiments, a back portion 29 is secured to a bar 10 with a fastener attaching through an opening 15. Such back portion houses a wheel 2 directed downwards. A wheel 2 is secured to a back portion 29 with an axle securing to an opening 16. In certain embodiments, a back portion 29 has a surface 40 allowing attachment of a caster wheel 41. When [tiling] *tilting* a wheelbarrow forward, caster wheels 41 touch the ground protecting a front portion or a cross member from catching on a surface. A caster wheel 41 allows multi-directional movement when the wheelbarrow is tilted forward. It will be appreciated that a caster wheel 41 can be employed in other embodiments disclosed herein.

When using certain embodiments of the invention, for example, while emptying a load from a wheelbarrow pan 17, a user tilts a wheelbarrow 3 forward. Certain embodiments of the invention have a front plate or a cross member. An embodiment of a cross member 8 is shown in FIG. 2A, another embodiment of a cross member 30 is shown in FIG. 8A, another embodiment of a cross member 35 is shown in FIG. 5, and another embodiment of a cross member 36 is shown in FIG. 7. While tilting a wheelbarrow forward and before the cross member engages with the ground, the wheels 2 touch the ground. The wheels 2 provide added protection that prevents a surface from being potentially damaged by a cross member. The wheels 2 provide an added benefit of adjusting the position of the wheelbarrow prior to tilting it forward and discharging a load. In another use example, while using a wheelbarrow found in certain embodiments of the invention, a user can carry a loaded wheelbarrow backwards down a set of stairs or down a curb while reducing the risk of damage to such surfaces. The wheels 2 prevent a cross member portion from scratching the surface, and carrying a load down a set of stairs or down a curb.

Figure 8B:
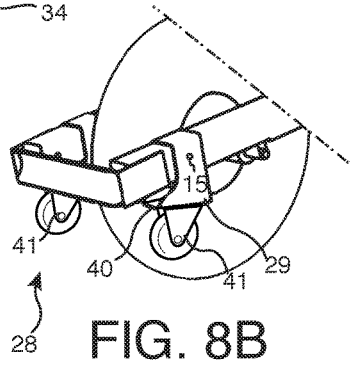
FIG. 8B. Close up perspective view of a wheelbarrow with an embodiment of a bumper.
Figure 9A:
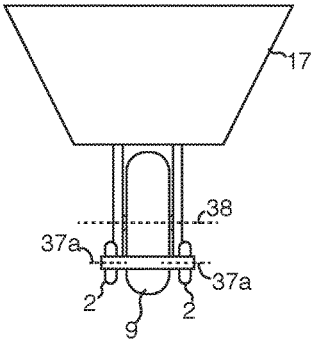
FIG. 9A. Front view of a wheelbarrow in certain embodiments.
Figure 9B:
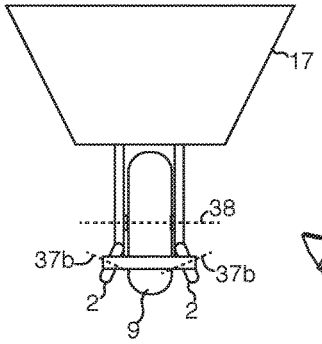
FIG. 9B. Front view of a wheelbarrow in certain embodiments.
Figure 9C:
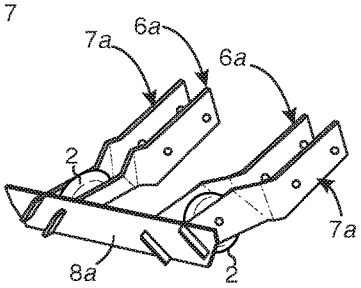
FIG. 9C. Perspective view of a wheelbarrow bumper in certain embodiments.

Referring to FIG. 9A, in certain embodiments, wheels 2 have an axis of rotation 37a generally parallel to the axis 38 of the main wheel 9 or wheels (i.e. wheels have a camber angle of 0°). Referring to FIG. 9B, in certain embodiments, the axis of rotation 37b of the wheels 2 is oblique to the axis 38 of the main wheel 9 or wheels (i.e. wheels have a camber angle of greater than or less than 0°). In certain embodiments, the wheels 2 are arranged such that the angle of the axis of rotation 37 is tilted between 0° and 45° relative to axis 38 of the main wheel (i.e. wheels have a camber angle of 45° to −45°). It will be appreciated by those skilled in the art that when a wheel is viewed from the front, a wheel having a negative camber angle has a bottom that that extends further out than the top, and a wheel having a positive camber angle has a top that extends further out than the bottom. In certain embodiments, a camber angle of between 45° and −45° is achieved by bending an attachment plate as shown in FIG. 2A, by bending a shaped member and inner attachment member as shown in FIG. 4A, FIG. 4B, FIG. 12A, and FIG. 12B, by bending a single body plate 27 as shown in FIG. 6 and FIG. 7, and by bending a back portion 29 as shown in FIG. 8A and FIG. 8B. An exemplary bumper with wheels having a negative camber angle is shown in FIG. 9C. Referring to FIG. 9C, the outer attachment member 7a and inner attachment member 6a have a shape accommodating a wheel 2 arranged with a negative camber angle. Such bumper has a cross member 8a attaching to the outer attachment member 7a and inner attachment member 6a.

Figure 10A:
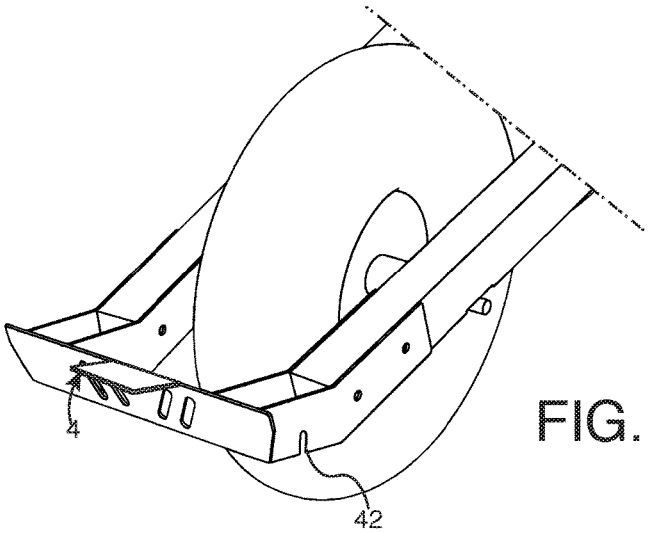
FIG. 10A. Perspective view of a wheelbarrow bumper embodiment having dropouts.
Figure 10B:
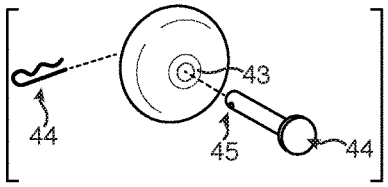
FIG. 10B. Exploded view of an exemplary removable wheel.

It will be appreciated that in certain situations, a user will be required to remove the wheels 2. Embodiments of a wheelbarrow bumper include features that allow a user to more quickly remove such wheels. In certain embodiments, a clevis pin 44 is placed through a wheel hub 43. A bumper retains the wheel by the clevis pin, such clevis pin 44 further retained with a cotter pin 44 or a split pin passing through a clevis pin opening 45, as shown in FIG. 10B.

Figure 10C:
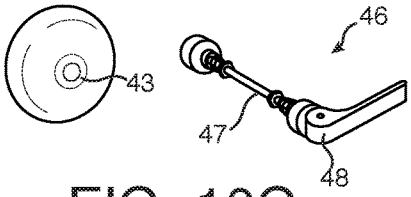
FIG. 10C. Perspective view of an exemplary quick release assembly.

In certain situations, other methods of quick removal of the wheel are appropriate. In certain embodiments, a quick release assembly 46, known to those skilled in the art, and as shown in FIG. 10C for exemplary purposes, retains the wheel on a wheelbarrow bumper. A wheel hub 43 is mounted on a quick release assembly rod 47. A quick release assembly 46 allows clamping the wheel on the quick release assembly rod 47 by operating the lever 48 into a closed position, It will be appreciated that a quick release assembly can be attached to a certain embodiments of a bumper having a dropout 42, as shown in FIG. 10A. It is noted that the clevis pin and cotter pin embodiment of FIG. 10B, and the quick release assembly of FIG. 10C are merely exemplary and are shown to illustrate ways in which a wheel can be removed from the bumper.

Figure 11:
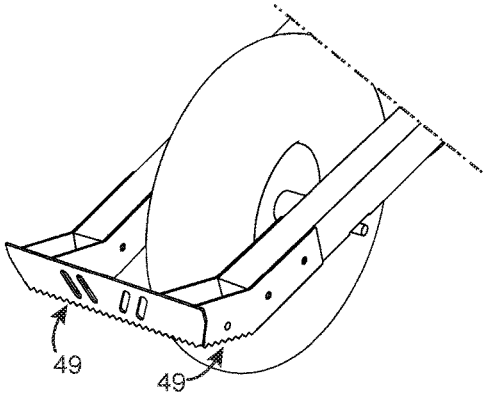
FIG. 11. Perspective view of a wheelbarrow bumper embodiment having lower surface features.

Referring to FIG. 11, certain embodiments allow for the wheels from the bumper to be removed. It may be advantageous to remove such wheels in certain situations. For example, when using a wheelbarrow on an inclined surface, a user may require additional traction afforded by the bumper. In certain embodiments, a bumper which includes a lower gripping feature 49 provides additional traction. It will be appreciated that any of the bumper embodiments shown herein may have removable wheels, or has a lower gripping feature 49, and is not limited to the example shown in FIG. 11.

Figure 12A:
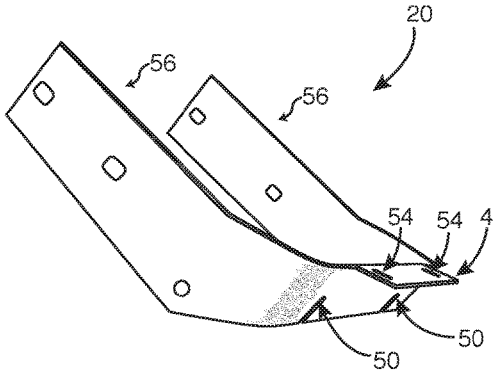
FIG. 12A. Perspective view of a shaped member in an embodiment of a bumper.
Figure 12B:
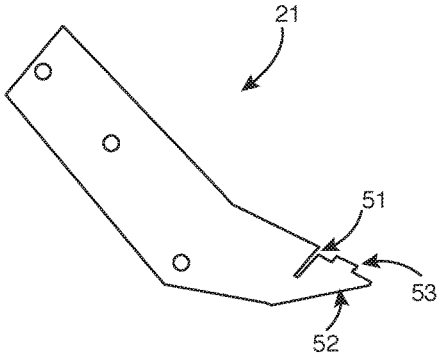
FIG. 12B. Perspective view of an attachment member in an embodiment of a bumper.
Figure 12C:
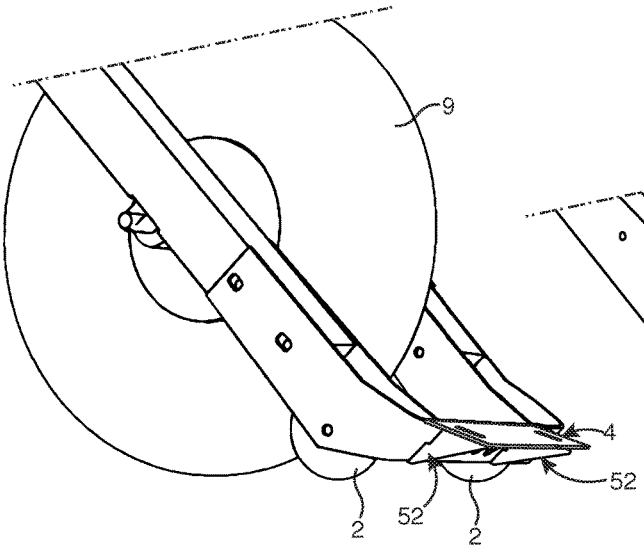
FIG. 12C. Close up perspective view of a wheelbarrow with an embodiment of a bumper.

Referring to FIG. 12A and FIG. 12B, in certain embodiments, a shaped member 20 has a slot 50 that slideably engages with a slot 51 of an inner attachment member 21. An extension 52 is adjacently located to inner attachment member slot 51, such extension 52 having a tab 53, which engages with a slot 54 of the flap 4 located on a shaped member 20. When assembled, as shown in for example in FIG. 12C, extension 52 of the inner attachment member 21 reinforces the flap 4 of the shaped member 20.

Figure 13:
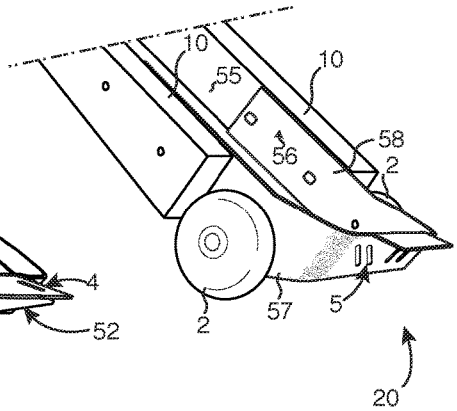
FIG. 13. Perspective view of a shaped member in an embodiment of a bumper.

In certain embodiments, a bumper is attached to a wheelbarrow end by at least one attachment member, and preferably by at least two attachment members. In certain embodiments, a shaped member 20 has a u-shape, with attachment ends 56 attaching to a surface 55 of the bar 10, as shown in FIG. 13. Still referring to FIG. 13, a wheel 2 has an axle mounted on an outer surface 57 of a shaped member 20. In certain embodiments, a wheel axle is mounted on an inner surface 58 of a shaped member 20, It will be appreciated that certain embodiments may have two inner attachment members attached to a cross member, or two outer attachment members attached to a cross member. In certain embodiments, a bumper's attachment member attaches to a bar on the bar's surfaces, including, but not limited to the bar's top surface, bottom surface, inward facing surface, or outward facing surface, or front surface, but is not limited to these surfaces.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The descriptive labels associated with the numerical references in the figures are intended to merely illustrate embodiments of the invention, and are in no way intended to limit the invention to the scope of the descriptive labels. The present systems, methods, means, and enablement are not limited to the particular systems, and methodologies described, as there can be multiple possible embodiments, which are not expressly illustrated in the present disclosures. It is also to be understood that the terminology used in the description is for the purpose of describing the particular versions or embodiments only, and is not intended to limit the scope of the present application.

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

What is claimed is:

1. A wheelbarrow comprising:

a frame, said frame further comprising a first wheel, a first bar, and a second bar, wherein an axle of said first wheel is disposed between said first and second bars;

a pan attached atop said frame;

a bumper attached on the forward end of said frame;

said bumper comprising a first attachment member, a second attachment member, a cross member, a second wheel, and a third wheel;

said first attachment member oriented parallel *to said first bar,* and attached to said first bar;

said second wheel attached to said first attachment member;

said second attachment member oriented parallel *to said second bar,* and attached to said second bar;

said third wheel attached to said second attachment member; and said cross member [perpendicular and] attached to said first attachment member and said second attachment member, wherein the second wheel and the third wheel are configured to engage the ground simultaneously to aid in steering the wheelbarrow when the wheelbarrow is tilted forward*, and*

*wherein said cross-member extends forward beyond the circumference of the second wheel and the third wheel.*

2. The wheelbarrow in claim 1, wherein said cross member further comprises a gripping feature.

3. The wheelbarrow in claim 2, wherein said gripping feature comprises a flap projecting outward from said cross member.

4. The wheelbarrow in claim 2, wherein said gripping feature comprises an opening in the cross member.

5. The wheelbarrow in claim 1, wherein said second wheel and third wheel have a camber angle between 45° and −45° relative to said first wheel.

6. The wheelbarrow in claim 1, wherein said cross member is slidably attached to said attachment members.

7. A wheelbarrow comprising:

a frame, said frame further comprising a first wheel, a first bar, and a second bar, wherein an axle of said first wheel is disposed between said first and second bars;

a pan attached atop said frame;

a bumper attached on the forward end of said frame;

said bumper comprising a first attachment member, a second attachment member, a cross member, a second wheel, and a third wheel;

said first attachment member oriented parallel *to said first bar,* and attached to said first bar;

said second wheel attached to said first attachment member;

said second attachment member oriented parallel *to said second bar,* and attached to said second bar;

said third wheel attached to said second attachment member;

said cross member [perpendicular and] attached to said first attachment member and said second attachment member;

a third attachment member attached to said first bar, and a fourth attachment member attached to said second bar, said second wheel disposed between said first attachment member and said third attachment member; and said third wheel disposed between said second attachment member and said fourth attachment member,

*wherein the wheelbarrow is configured to roll in a forward direction with at least two wheels with rollable engagement with the ground,*

*wherein an axis of rotation of the second wheel is not perpendicular to the axle of the first wheel, and*

*wherein an axis of rotation of the third wheel is not perpendicular to the axle of the first wheel.*

8. The wheelbarrow in claim 7, wherein said bumper is formed from a single plate, said plate bent to form a bumper shape.

* * * * *